United States Patent [19]

Gore

[11] 3,877,618
[45] Apr. 15, 1975

[54] LOST MOTION FLUID MEASURING VALVE ASSEMBLY
[75] Inventor: William C. Gore, Elgin, Ill.
[73] Assignee: Olin Corporation, New Haven, Conn.
[22] Filed: Mar. 25, 1974
[21] Appl. No.: 454,049

[52] U.S. Cl......... 222/402.2; 123/187.5 R; 222/450
[51] Int. Cl. ............................................. G01f 11/38
[58] Field of Search............... 123/187.5 R, 187.5 P; 222/402.2, 450, 284, 436, 3, 446

[56] References Cited
UNITED STATES PATENTS

| | | | |
|---|---|---|---|
| 700,984 | 5/1902 | Sherwood | 222/436 |
| 3,198,404 | 8/1965 | Welches | 222/446 X |
| 3,394,851 | 7/1968 | Gorman | 222/402.2 |

Primary Examiner—Robert B. Reeves
Assistant Examiner—David A. Scherbel
Attorney, Agent, or Firm—Donald R. Motsko; William W. Jones

[57] ABSTRACT

A valve assembly for providing a measured amount of fluid under pressure. A pair of valves are disposed, one upstream and one downstream of a measuring chamber. The upstream valve is normally closed to the measuring chamber and the downstream valve is normally open to the measuring chamber. A lost motion connection is provided between the two valves so that the downstream valve is closed and then the upstream valve is opened to admit fluid under pressure into the measuring chamber. Release of the connection results in reclosing of the upstream valve followed by reopening of the downstream valve to permit dispensing of the measured charge from the measuring chamber. The assembly may be manually or mechanically or electrically actuated.

7 Claims, 4 Drawing Figures

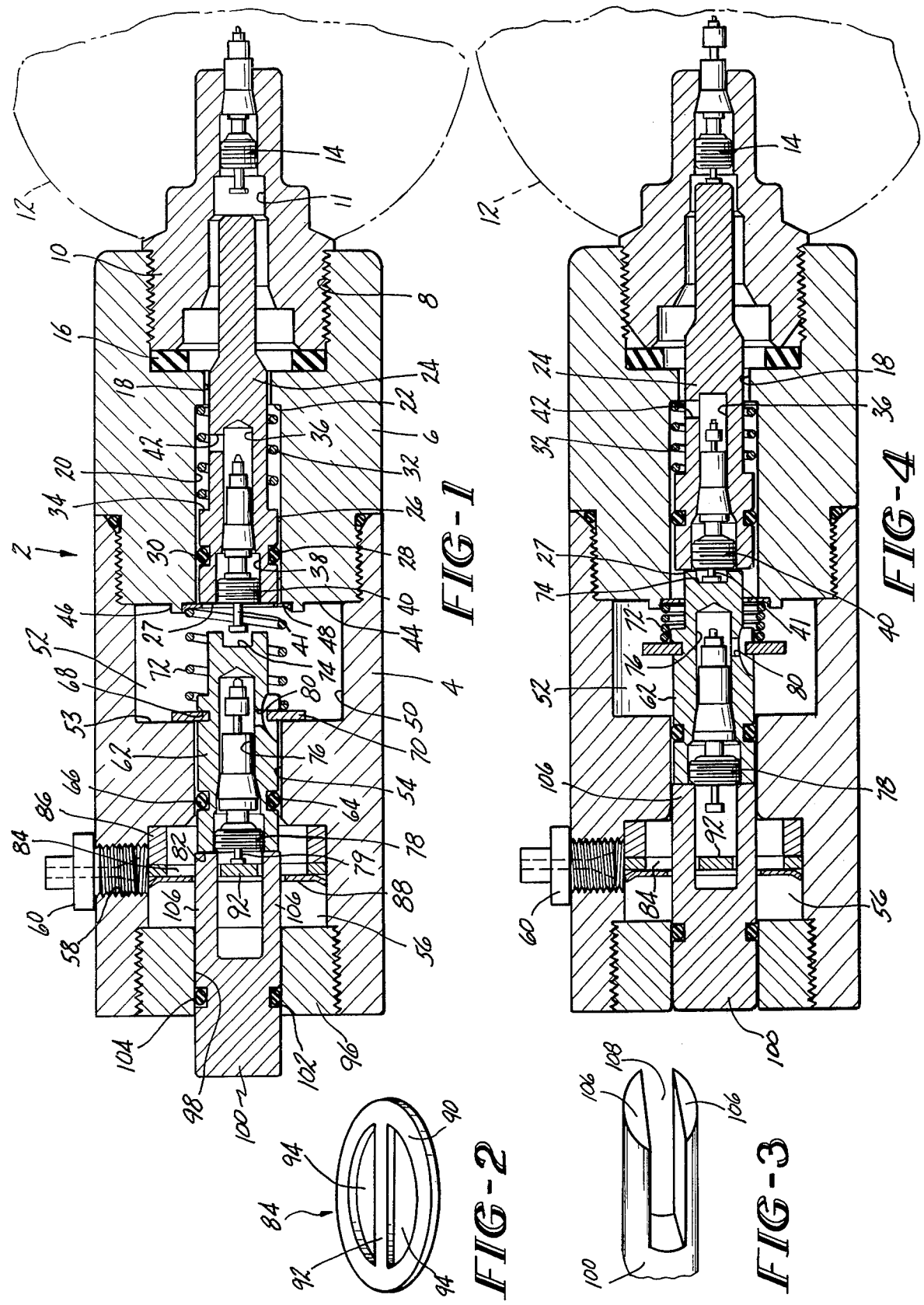

LOST MOTION FLUID MEASURING VALVE ASSEMBLY

This invention relates to a valve assembly for providing and dispensing a measured charge of fluid under pressure from a supply thereof.

Valve assemblies for providing a measured amount or charge of a fluid under pressure from a bulk supply thereof are known in the prior art. Such valve assemblies have found wide spread usage in various areas, one of which relates to cold weather starting of diesel engines.

Prior art diesel engine starting assemblies include a bulk supply of a starting fluid, such as diethyl ether, which is kept in a storage tank under pressure. The storage tank outlet is sealed with a conventional tire valve having sealing surfaces of suitable material to withstand ether attack. A measuring and dispensing valve assembly is connected to the storage tank, and is actuated, when needed, to withdraw a measured amount of the starting fluid from the bulk supply, and then transfer the measured amount of the starting fluid to the engine manifold, where the starting fluid is burned to turn the engine over in cold weather. These measuring and dispensing valve assemblies include a measuring chamber, a valve for opening and closing an outlet from the measuring chamber, and a probe for opening and closing the storage outlet valve. U.S. Pat. Nos. 3,189,014 to M. L. Kus, issued June 15, 1965; and 3,198,404 to J. H. Welches, issued Aug. 3, 1965 are directed to such arrangements.

When dispensing highly combustible fluids, such as diethyl ether for injection into a diiesel engine it is important that the amount of combustible fluid delivered to the engine be consistent from shot to shot. Delivery of too little of the combustible fluid will be ineffective in starting the engine, and delivery of too much of the combustible fluid to the engine will harm the engine. Thus it is apparent that adequate measures must be taken to ensure that just the right amount of fluid will be delivered to the engine.

In order to ensure that the amount of fluid delivered to the engine will be consistent from shot to shot, steps must be taken to close the outlet or downstream end of the measuring chamber. If this is not done, the fluid will flow from the source right through the measuring chamber until the latter is closed. This can result in too much fluid being injected into the engine. It is also important to take steps to ensure that the bulk source of fluid will be sure to be opened to the measuring chamber after the outlet of the measuring chamber has been closed. Thus the probe used to open the bulk source outlet valve should be free for continued opening movement after the measuring chamber outlet valve has been closed. If the extent of movement of the probe is limited by the extent of movement of the measuring chamber outlet valve, then the possibility arises that the probe will not be able to move far enough to open the bulk source outlet valve when the outlet valve on the measuring chamber has been closed.

The valve assembly of this invention includes a housing which contains a fluid measuring chamber. A fluid passage extends through the housing, the pasage having a first part upstream of the measuring chamber to form an inlet therefor. A second part of the passage is downstream of the measuring chamber and forms an outlet therefor. In the inlet part of the fluid conduit there is disposed a movable probe which is used to open and close the outlet valve on a cylinder of fluid, which cylinder forms the bulk supply of fluid. Downstream from the probe, in the inlet part of the fluid conduit is a first tire valve which is normally closed to fluid flow from the bulk supply of fluid. Thus the measuring chamber is normally closed against fluid being admitted thereto from the fluid supply. In the outlet portion of the fluid conduit there is a second tire valve which is normally open to fluid flow from the measuring chamber. The second tire valve is movably mounted in the fluid conduit and biased therein to the open position. A movable actuator is also disposed in the outlet part of the fluid conduit downstream of the second tire valve. To operate the assembly, the actuator is pushed so as to move the outlet or second tire valve away from its open position so that it closes, at which point the measuring chamber is closed against fluid flowing through the outlet part of the conduit. Continued movement of the actuator results in the first or inlet tire valve being opened so that the inlet part of the conduit is open for fluid flow into the measuring chamber. Still further movement of the actuator causes the probe to move against the bulk supply outlet valve to open the latter resulting in fluid flow from the fluid bulk supply into the measuring chamber. The actuator is held depressed until the measuring chamber fills with fluid. Release of the actuator results in withdrawal of the probe from te bulk source outlet valve, hence closure of the bulk source outlet, followed by closure of the measuring chamber inlet valve and terminates with opening of the measuring chamber outlet valve with subsequent discharge of the measured quantity of fluid from the measuring chamber through the outlet. The sequential opening and closing of valves results in a high degree of safety and reliability of operation in the valve assembly of this invention.

It is, therefore, an object of this invention to provide a fluid measuring and dispensing assembly for use in conjunction with a bulk supply of fluid under pressure from which measured amounts of the fluid are periodically dispensed.

It is a further object of this invention to provide a fluid measuring and dispensing assembly of the character described wherein safeguards are provided to ensure that the measuring chamber outlet is closed before fluid is admitted thereto to prevent excessive amounts of fluid from being dispensed.

It is yet another object of this invention to provide a fluid measuring and dispensing assembly of the character described wherein a probe is used to periodically open a closure valve on a bulk storage reservoir of fluid to admit fluid into the measuring chamber.

These and other objects and advantages of the invention will become more readily apparent from the following detailed description of one embodiment of the invention taken in conjunction with the accompanying drawings, in which FIG. 1 is an axial sectional view of one embodiment of a fluid measuring and dispensing valve assembly formed in accordance with this invention, the assembly being shown in its dispensing condition; FIG. 2 is a perspective view of an activation-deactivation ring used to open and close the measuring chamber outlet valve;

FIG. 3 is a fragmented perspective view of the inner end portion of the actuating rod of FIG. 1; and FIG. 4 is an axial sectional view of the valve assembly of FIG. 1 shown in its measuring condition.

Referring now to FIG. 1, an embodiment of a fluid measuring and dispensing valve assembly formed in accordance with this invention is shown. The assembly includes a compound housing 2 which comprises a housing body 4 threaded onto a housing end cap 6. The end cap 6 is provided with a threaded bore 8 which is adapted to be screwed into a standard externally threaded fitting 10 mounted on the outlet end of a pressurized fluid cylinder 12 (shown in phantom). The fitting 10 contains a tire valve assembly 14 which controls withdrawal of the pressurized fluid from the cylinder 12. It will be noted that the fitting 10 and tire valve assembly 14 are a conventional construction commonly used in throw-away propane, butane, and other fuel-dispensing systems having sealing material which will withstand ether attack. It will be appreciated that the system disclosed is adapted for measuring and dispensing diethyl ether or the like combustible fluid for use in cold weather starting of diesel engines. When the cap 6 is screwed tightly down onto the fitting 10, a gasket 16 seals the joint between the end cap 6 and fitting 10.

The housing cap 6 is provided with an axially extending through passage 18 which is counterbored at 20 so as to form a radially outwardly extending shoulder 22. A probe 24 is slidably mounted in the passage 18 and 20 and includes an enlarged head portion 26 having a groove 28 in which is mounted a resilient O ring 30 which forms a fluid tight sliding seal with the passage counterbore 20. A coil spring 32 is mounted in the counterbore 20 and seats at one end against the shoulder 22 and at the other end against the end surface 34 of the head 26 so as to bias the probe 24 away from the cylinder outlet valve 14. The probe 24 is provided with an internal axial bore 36 and a threaded counterbore 38 which receives a tire valve 40 for controlling fluid flow through the probe bore 36. A radially extending passage 42 establishes fluid communication between the cap counterbore 20 and the probe bore 36. It will be understood that the outside diameter of the probe 24 is sized so that fluid may flow from the cylinder 12 through the outlet valve 14 (when opened) and thence through the fitting bore 11 into the housing cap passage 18 and its counterbore 20, and thence through the radial passage 42 into the probe bore 36. It will also be noted that the stem 41 of the tire valve 40 extends beyond the end wall 27 of the probe head 26. The end wall 44 of the cap 6 is formed with an annular boss 46 in which is fitted an external toothed retaining ring 48 which prevents the probe 24 from being expelled from the bore 20 by the spring 32.

The housing body 4 is counterbored at 50 so as to combine with the cap 6 to form a fluid measuring chamber 52. A passage 54 extends from the measuring chamber 52 through the body 4 to a counterbored outlet chamber 56 which communicates with a radial outlet passage 58 provided with a standard hollow fitting 60. The fitting is connected to a conduit (not shown) which conducts the fluid dispensed through the outlet 58 to the engine (not shown). A slide member 62 is slidably mounted in the passage 54 extends into the measuring chamber 52. The slide 62 is provided with an external groove 64 in which is mounted a resilient O ring 66 operative to seal the passage 54 against fluid flow therethrough. A second groove 68 is formed in the slide 62 and a snap ring 70 is mounted in the groove 68 to limit the extent of movement of the slide 62 in one direction within the passage 54. The ring 70 also provides a bearing surface for a coil spring 72, which also bears against the retaining ring 48 and which biases the slide 62 to the left as viewed in FIG. 1, so that the ring 70 is biased against the end wall 53 of the measuring chamber 52. The inner end wall 74 of the slide 62 is U-shaped and is normally axially spaced apart from the valve stem 41.

The slide 62 is provided with an internal bore 76 in which is fitted a tire valve assembly 78. A radial passage 80 interconnects the slide bore 76 and the measuring chamber 52. The valve stem 79 of the valve 78 projects beyond the end wall 82 of the slide 62. The valve stem 79 is biased against an activating ring 84 by the spring 72 so that the valve 78 is normally open to fluid flow. The activating ring 84 is held in place within the outlet chamber 56 by an annular spacer ring 86 and an external toothed retaining ring 88. As will be seen from FIG. 2, the activating ring 84 includes an annular circumferential portion 90 and a diametrically extending bar portion 92, the latter of which actually engages the valve stem 79. Fluid flows past the activating ring 84 through open spaces 94.

A bushing 96 is threaded into one end of the housing 4 and includes a bore 98 in which is slidably mounted an actuator 100. The actuator 100 is provided with an external groove 102 in which is disposed a resilient O ring 104 which seals the bore 98 against fluid leakage. The inner end of the actuator 100 is clevis-shaped and includes a pair of opposed prongs 106 (see FIG. 3) separated by a gap 108. As will be noted from FIG. 1, the prongs 106 extend through the openings 94 in the activating ring 84 and abut the end wall 82 of the slide 62. In FIG. 1, the actuator 100 is shown in its normal at rest position.

As will be noted from FIG. 1, the valve assembly is in its unactuated or "at-rest" condition, wherein the fluid cylinder outlet valve 14 is closed against fluid flow from the cylinder 12, the probe valve 40 is closed against fluid flow and the slide valve 78 is open to fluid flow. It will be noted that the cap passages 18 and 20 combine with the probe passages 36 and 42 to form an inlet conduit to the measuring chamber 52, and the probe valve 40 controls fluid flow through the measuring chamber inlet conduit to the measuring chamber. It will be further noted that the fluid cylinder outlet valve 14 controls fluid flow from the fluid cylinder or reservoir into the measuring chamber inlet conduit. It will further be noted that the slide passages 80 and 76 form an outlet from the measuring chamber 52 to the outlet chamber 56 and that the valve 78 controls fluid flow through the measuring chamber outlet conduit. It is readily apparent that each of the valves 14, 40 and 78 is actuatable independently of each other. Thus the valves 14 and 40 that control fluid flow into the measuring chamber are normally closed and the valve 78 which controls fluid flow out of the measuring chamber is normally open, and there are two valves 14 and 40 normally closed to guard against unwanted leakage of the fluid from the cylinder 12 into the measuring chamber 52. As will be noted in the preferred embodiment, the valves 40 and 78 are installed so as to work with gas pressure rather than against it. With this method of assembly, the valves 40 and 78 will withstand a force of 400 psi. If they were reversed, a gas pressure of about 70 psi would prematurely open the valves 40 and 78.

With reference to FIG. 4, the assembly operates as follows to measure and dispense a predetermined amount of fluid from the cylinder. The actuator 100 is pushed tooward the measuring chamber 52 mechanically, manually, with a solenoid means, or by any other means. Movement of the actuator results in the prongs 106 pushing against the slide 62 so that the slide 62 is moved further into the measuring chamber 52, compressing the spring 72. As the slide 62 moves into the measuring chamber 52, the slide valve 78 is moved away from the activating ring 84 so that the slide valve 78 automatically closes the measuring chamber outlet conduit against fluid flow from the measuring chamber 52 to the outlet chamber 56.

As the slide 62 advances into the measuring chamber 52, the clevised end surface 74 of the slide engages the stem 41 of the valve 40 and opens the latter so that the measuring chamber inlet conduit is thereby opened to fluid flow therethrough. The slide end surface 74 also engages the end wall 27 of the probe 24 so that further movement of the slide 62 results in movement of the probe 24 toward the cylinder outlet valve 14 with a resultant compression of the spring 32. The probe 24 continues to advance iuntil it contacts and depresses the stem of the cylinder outlet valve 14, thus opening the latter to permit fluid to flow out of the cylinder. The fluid thus flows past the valve 14 and into the measuring chamber 52 until the latter is filled. It will be noted that filling of the measuring chamber 52 occurs relatively instantaneously, and that only the amount of fluid which fills the measuring chamber 52 will flow thereinto since the slide valve 78 is closed, no matter how long the actuator 100 is depressed. It will be noted that the fact that movement of the slide valve 78 away from the activator ring closes the valve 78 gives the system a substantial lost motion ability so that the valve opening movements of the slide 62 and probe 24 are readily accommodated. The opening and closing of outlet and inlet valves is accomplished in separate steps rather than concurrently as with the prior art systems, thus increasing the utility of the system and giving wider dimensional tolerances for the various system components.

To dispense the charge of fluid in the measuring chamber 52 the depressing force acting on the actuator 100 is removed. The spring 32 then returns to its original length moving the probe 24 away from the cylinder valve 14 permitting the latter to close. The spring 72 then returns to its original length moving the slide 62 away from the probe valve 40 permitting the latter to close. As the slide 62 moves away from the probe 24, the slide valve 78 is moved toward the activator ring 84 until the slide valve 78 is opened, thus opening the measuring chamber 52 for fluid flow therefrom through the measuring chamber outlet conduit to the outlet chamber 56 and thence through the outlet fitting 60 to the engine (not shown) by way of a flexible hose or the like (not shown).

As previously noted, it will be readily appreciated that the measuring and dispensing valve assembly of this invention permits a greater latitude with respect to dimensional tolerances and provides for greater versatility and safety. Opening and closing of the individual valves in the assembly is accomplished in a definite sequence instead of concurrently thus compensating for dimensional variances. Flow of fluid through the valve assembly directly from the cylinder is thus prevented.

The entire assembly is of relative simplicity and low expense, and cannot be easily accidentally opened by fluid pressure from the reservoir cylinder.

Since many changes and variations of the disclosed embodiment of the invention may be made without departing from the inventive concept, it is not intended to limit the invention otherwise than as required by the appended claims.

What is claimed is:

1. An apparatus for providing a measured amount of a fluid under pressure, said apparatus comprising:
   a. a housing having an inlet and an outlet;
   b. means providing a fluid flow path through said housing from said inlet to said outlet;
   c. means providing a fluid measuring chamber in said housing on said flow path, said flow path providing a measuring chamber inlet and a measuring chamber outlet;
   d. first valve means in said flow path between said housing inlet and said measuring chamber inlet, said first valve means being normally closed against fluid flow from said housing inlet to said measuring chamber inlet;
   e. second valve means in said flow path between said measuring chamber outlet and said housing outlet, said second valve means being normally open to fluid flow from said measuring chamber to said housing outlet; and
   f. actuator means slidably mounted in said housing for reciprocating movement between a first position and a second position and return, said actuator means being operable when moved from said first position to said second position, to sequentially close said second valve means and with continuing movement to thereafter open said first valve means to permit fluid to flow from said housing inlet to said measuring chamber and be retained therein to form a measured charge of fluid, and said actuator further being operable when returned from said second position to said first position to sequentially close said first valve means and with continuing movement to thereafter open said second valve means to permit fluid to flow from said measuring chamber to said housing outlet.

2. An apparatus for providing a measured amount of a fluid under pressure, said apparatus comprising:
   a. a housing having an inlet and an outlet;
   b. means providing a fluid flow path through said housing from said inlet to said outlet;
   c. means providing a fluid measuring chamber in said housing in fluid communication with said flow path;
   d. activating means mounted in said flow path between said measuring chamber and said outlet;
   e. a first tire valve movably mounted in said flow path between said activating means and said measuring chamber;
   f. spring means for biasing said first tire valve against said activating means to open said first tire valve for fluid flow therethrough;
   g. a second valve mounted in said flow path between said housing inlet and said measuring chamber, said second valve normally being closed against fluid flow from said housing inlet to said measuring chamber; and
   h. actuating means mounted on said housing for reciprocating movement between a first position and a second position and return, movement of said actuating means from said first position to said second position being operative to move said first valve away from said activating means to close said first valve, and further being operative to open said second valve to permit fluid flow from said housing inlet to said measuring chamber, and return movement of said actuating means being operative to close said second valve against fluid flow and move said first valve against said activating means to open said first valve and enable fluid flow from said measuring chamber to said housing outlet.

3. An apparatus for providing a measured amount of a fluid under pressure from a reservoir of a bulk supply of fluid, said apparatus comprising:
  a. means forming a measuring chamber for containing a predetermined volume of fluid under pressure;
  b. means forming a first fluid flow passage into said measuring chamber from the fluid reservoir;
  c. probe means movably mounted in said first fluid flow passage, said probe means being operable, when moved from a first position to a second position, to open the reservoir of fluid for flow of fluid therefrom into said first fluid flow passage;
  d. means forming a second fluid flow passage from said measuring chamber;
  e. valve means in said second fluid flow passage, said valve means being normally open to fluid flow from said measuring chamber through said second fluid flow passage; and
  f. actuator means operable to close said valve means against fluid flow therethrough and to move said probe means to said second position with movement of said probe means toward said second position continuing after said valve means has been closed.

4. An apparatus for providing a measured amount of a fluid under pressure from a reservoir of a bulk supply of fluid, said apparatus comprising:
  a. means forming a measuring chamber for containing a predetermined amount of fluid under pressure;
  b. means forming an inlet flow passage extending into said measuring chamber;
  c. means forming an outlet flow passage extending out of said measuring chamber;
  d. a probe movably mounted in said inlet flow passage for opening the reservoir for fluid flow to said measuring chamber;
  e. a slide mounted in said outlet flow passage, said slide being movable independently of movement of said probe and movable against said probe to cause reservoir-opening movement of said probe to occur, and said slide having an internal conduit forming at least a portion of said outlet flow passage;
  f. valve means in said internal conduit of said slide for controlling fluid flow through said outlet flow passage; and
  g. means for closing said valve means when said slide is moved toward said probe and for opening said valve means when said slide is moved away from said probe.

5. The apparatus of claim 4, further comprising spring means for biasing said slide in a direction away from said probe whereby said valve means is normally open to fluid flow through said outlet passage.

6. The apparatus of claim 4, wherein said probe includes an internal conduit forming at least part of said inlet flow passage; and further comprising second valve means mounted in said internal conduit of said probe to control fluid flow through said inlet flow passage, said second valve means being normally closed to fluid flow and being aligned with said slide for engagement therewith when said slide is moved against said probe, engagement of said slide with said second valve means being operable to open the latter to fluid flow through said inlet flow passage.

7. The apparatus of claim 6 further comprising spring means to bias said probe toward said slide.

* * * * *